US007757182B2

(12) United States Patent
Elliott et al.

(10) Patent No.: US 7,757,182 B2
(45) Date of Patent: Jul. 13, 2010

(54) TASKBAR MEDIA PLAYER

(75) Inventors: Geoffrey John Elliott, Seattle, WA (US); Richard William Saunders, Lake Forest Park, WA (US); Myron Clifford Thomas, Newcastle, WA (US); Madhuvan Gupta, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1091 days.

(21) Appl. No.: 10/606,037

(22) Filed: Jun. 25, 2003

(65) Prior Publication Data

US 2004/0268261 A1    Dec. 30, 2004

(51) Int. Cl.
*G06F 3/048*    (2006.01)
*G06F 3/00*     (2006.01)

(52) U.S. Cl. .................. 715/779; 715/716; 715/719; 715/727; 715/810; 715/845

(58) Field of Classification Search ................ 715/716, 715/810, 764, 779, 845, 719, 727, 763, 835
See application file for complete search history.

(56) References Cited

U.S. PATENT DOCUMENTS

| | | | | |
|---|---|---|---|---|
| 5,923,326 | A * | 7/1999 | Bittinger et al. | 715/805 |
| 6,028,604 | A | 2/2000 | Matthews, III et al. | |
| 6,067,559 | A | 5/2000 | Allard et al. | |
| 6,072,486 | A | 6/2000 | Sheldon et al. | |
| 6,075,534 | A * | 6/2000 | VanBuskirk et al. | 715/835 |
| 6,097,380 | A | 8/2000 | Crites et al. | |
| 6,141,003 | A | 10/2000 | Chor et al. | |
| 6,177,931 | B1 | 1/2001 | Alexander et al. | |
| 6,202,212 | B1 | 3/2001 | Sturgeon et al. | |
| 6,219,042 | B1 | 4/2001 | Anderson et al. | |
| 6,248,946 | B1 * | 6/2001 | Dwek | 84/609 |
| 6,262,724 | B1 * | 7/2001 | Crow et al. | 715/723 |
| 6,266,059 | B1 | 7/2001 | Matthews, III et al. | |
| 6,313,851 | B1 | 11/2001 | Matthews, III et al. | |
| 6,344,865 | B1 | 2/2002 | Matthews, III et al. | |
| 6,357,042 | B2 * | 3/2002 | Srinivasan et al. | 725/32 |
| 6,384,849 | B1 | 5/2002 | Morcos et al. | |
| 6,452,609 | B1 * | 9/2002 | Katinsky et al. | 715/716 |
| 6,469,721 | B2 | 10/2002 | Matthews, III et al. | |
| 6,507,875 | B1 | 1/2003 | Mellen-Garnett et al. | |
| 6,624,831 | B1 * | 9/2003 | Shahine et al. | 715/815 |
| 6,727,918 | B1 * | 4/2004 | Nason | 715/791 |
| 6,859,937 | B1 | 2/2005 | Narayan et al. | |
| 6,904,566 | B2 * | 6/2005 | Feller et al. | 715/728 |
| 6,904,599 | B1 * | 6/2005 | Cabrera et al. | 719/328 |
| 6,954,897 | B1 | 10/2005 | Noguchi et al. | |
| 6,980,979 | B2 * | 12/2005 | Huang et al. | 707/2 |
| 7,113,168 | B2 * | 9/2006 | Oya et al. | 345/157 |
| 7,386,784 | B2 * | 6/2008 | Capps et al. | 715/203 |

(Continued)

OTHER PUBLICATIONS

@MAX Tray Player 0.97b , Jun. 21, 2003.*

(Continued)

*Primary Examiner*—Ba Huynh
*Assistant Examiner*—Nicholas Augustine

(57) ABSTRACT

A system and method for controlling media through a user interface integrated within a taskbar is described. This system and method enable a user to control media while a user interface of another application remains in perspective. Further, this system includes a taskbar media player, which can play media and enable a user to control the play of that media from within a taskbar.

46 Claims, 10 Drawing Sheets

U.S. PATENT DOCUMENTS

| | | | |
|---|---|---|---|
| 2003/0044171 A1 | | 3/2003 | Otsuka et al. |
| 2004/0212640 A1* | | 10/2004 | Mann et al. .................. 345/792 |
| 2005/0050301 A1* | | 3/2005 | Whittle et al. ................. 712/32 |
| 2005/0198220 A1* | | 9/2005 | Wada et al. .................. 709/220 |
| 2009/0119688 A1 | | 5/2009 | Gupta |

OTHER PUBLICATIONS

Mystik Media, Jan. 2002, http://web.archive.org/web/20020122214802/http://www.trayaudio.com/ copyright 2001-2002.*

GustoSoft.com; Nov. 2002, http://web.archive.org/web/20021130001235/http://gustosoft.com/.*

Stardock.net, DesktopX, 2002.*

Stardock.net, Object Bar, 2002.*

Wikipedia.org; http://en.wikipedia.org/wiki/Windows_Explorer.*

Windows Explorer. Wikipedia, the free encyclopedia [online]. Wikipedia, 2008 [retrieved on Apr. 25, 2008]. Retrieved from the Internet: <URL: http://en.wikipedia.org/wiki/Windows_Explorer>.*

"A MPEG-4 Media Presenter on Real-Time OS", Shin et al., PDPTA '00 International Conference, pp. 2310-2317.

"Distributed parallel volume rendering on shared memory systems", Hancock et al., Future Generation Computer Systems 13 (1997/98), pp. 251-259, 1998 Elsevier Science B.V.

"RIVA: A Versatile Parallel Rendering System for Interactive Scientific Visualization", Li et al., IEEE Transactions on Visualization and Computer Graphics, vol. 2, No. 3, Sep. 1996, pp. 186-201.

Microsoft Press, "Microsoft Computer Dictionary", *Microsoft Computer Dictionary 5th Edition*, 423.

* cited by examiner

TASKBAR MEDIA PLAYER

TECHNICAL FIELD

This invention relates to a system and method for playing and controlling media through a taskbar.

BACKGROUND

Computer users like to multitask. That is, they like to interact with more than one service at once. Some applications, such as Microsoft's® MSN8 Internet Software®, allow users to interact with multiple types of services without needing to interact with multiple applications. MSN8 allows, for example, a user to browse the Internet and at the same time enjoy and control media, like hear and control a song, or see and control a video clip. Most applications, however, do not provide a user with a media player to enjoy media at the same time as perform other tasks in the application. For example, most word processing and email applications—in which many users spend a great deal of time working—do not provide users with a media player to enjoy and control media.

Users can work around this problem with non-media applications in some limited ways, however. A user can open a media player to provide media-playing services. Once interacting with the media player's window (and thus not the non-media application's window) the user can have the media player play media, like a video clip or a song. Once the media is playing, the user can then switch back to the non-media application to work in and interact with the non-media application, and the media can continue playing.

One problem with this, however, is that to control the media being played, the user has to switch perspective from the non-media-playing application back to the media player. A user interface or window that is not in perspective cannot fully interact with a user, such as by receiving input from a user and actively display information to the user.

Thus, the user has to cease working in and interacting with the non-media application to interact with the media player's window so that the user can control the media being played. The user often cannot change the volume, advance to another song on a CD being played, or otherwise control the media without first disengaging from the non-media application's window, initializing engagement with the media player's window to put it in perspective, and make the control change. After this the user still has to re-engage with the non-media application's window to go back to working in and interacting with the non-media application.

At the least, most users have to take the time and effort to click on the media player's window to put it in perspective, make the control (such as by clicking on a fast forward button), and click on the other application to bring it back into perspective. This can be three mouse-clicks, for each of which the user may have to locate and move the mouse to a particular spot. This can take an appreciable amount of time, in part because the user has to perform it, but also if a computer system running these applications takes time to bring these applications in and out of perspective. Thus, this switching back and forth between applications in order to control media can be time consuming and inconvenient for a user.

User interfaces for typical media-playing applications can also be inconvenient. Many user interfaces for media-playing applications take up significant space on the screen, possibly interfering with the user's interaction with the non-media-playing application.

In FIG. 1, for example, a media-playing application's window 102 obscures a non-media-playing application's window 104.

Also, the controls on these user interfaces can become obscured by other user interfaces (like windows), making them hard to find. If, for example, the non-media-playing application's window 104 were brought back into perspective, such as by bringing it into focus (not shown), the window 104 could cause a media-playing application's controls 106 to be obscured by the non-media-playing application's window 104. This is because a window or user interface that is in focus will usually be brought to the forefront, thereby potentially obscuring other windows and user interfaces.

This further inconvenience makes typical media-playing applications difficult to use when also using a non-media-playing application. With typical media-playing applications, the user has to locate the controls, which could be obscured or moved, bring into perspective the user interface (such as by clicking on the media-playing application's window), select a service through the control, and then go back to the non-media-playing application's window in which the user wishes to continue working.

Current systems and methods do not provide users with sufficient ability to control media unless the application being used contains a media player. For applications that do not, users often cannot conveniently and quickly control media when also working in another application.

SUMMARY

The following description and figures describe a system and method for playing and controlling media with a player integrated into a taskbar. This system and method enables a user to control media quickly and easily through controls in a taskbar, as well as view visual media in a visual space connected to the taskbar.

DETAILED DESCRIPTION

The following disclosure describes a media player integrated into a taskbar. This taskbar media player and its related methods enable a user to control media quickly and easily, even if the user is working in another application. Unlike current media players, the taskbar media player's controls do not get in the way of other applications' windows, and do not require a user to bring the player into perspective or cease perspective with other applications in order to interact with it. This saves a user time and effort. The taskbar player also includes a visual space for viewing visual media, which can make viewing media while also working in another application more convenient than in the current state of the art. In short, this taskbar player and related methods allow a user to more easily control and view media.

Figure 1:
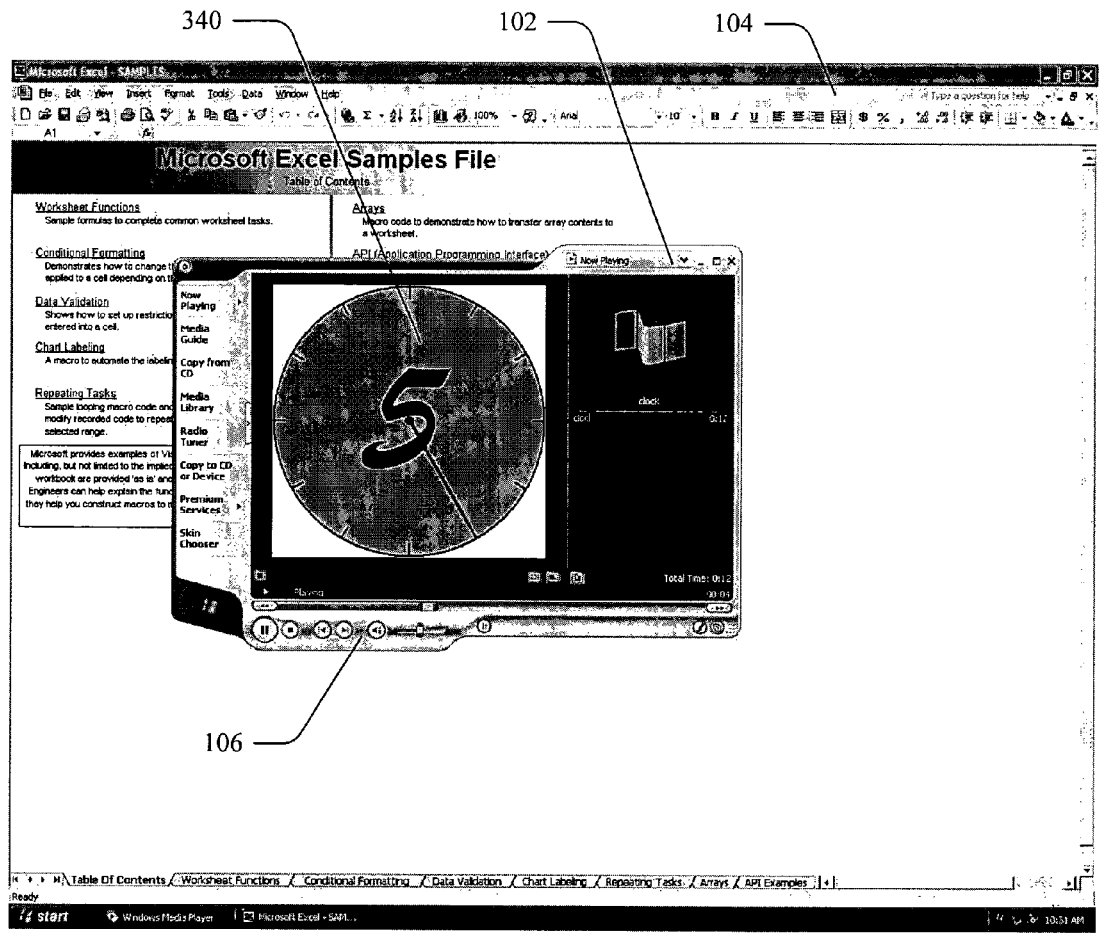
FIG. 1 illustrates exemplary user interfaces for a non-media-playing application and a media-playing application.

In FIG. 1, for example, the non-media-playing application's window 104 is obscured by the media-playing application's controls 106. If, on the other hand, the non-media-playing application were brought back into perspective (not shown), the window 104 could obscure the media-playing application's controls 106 and window 102.

Figure 2:
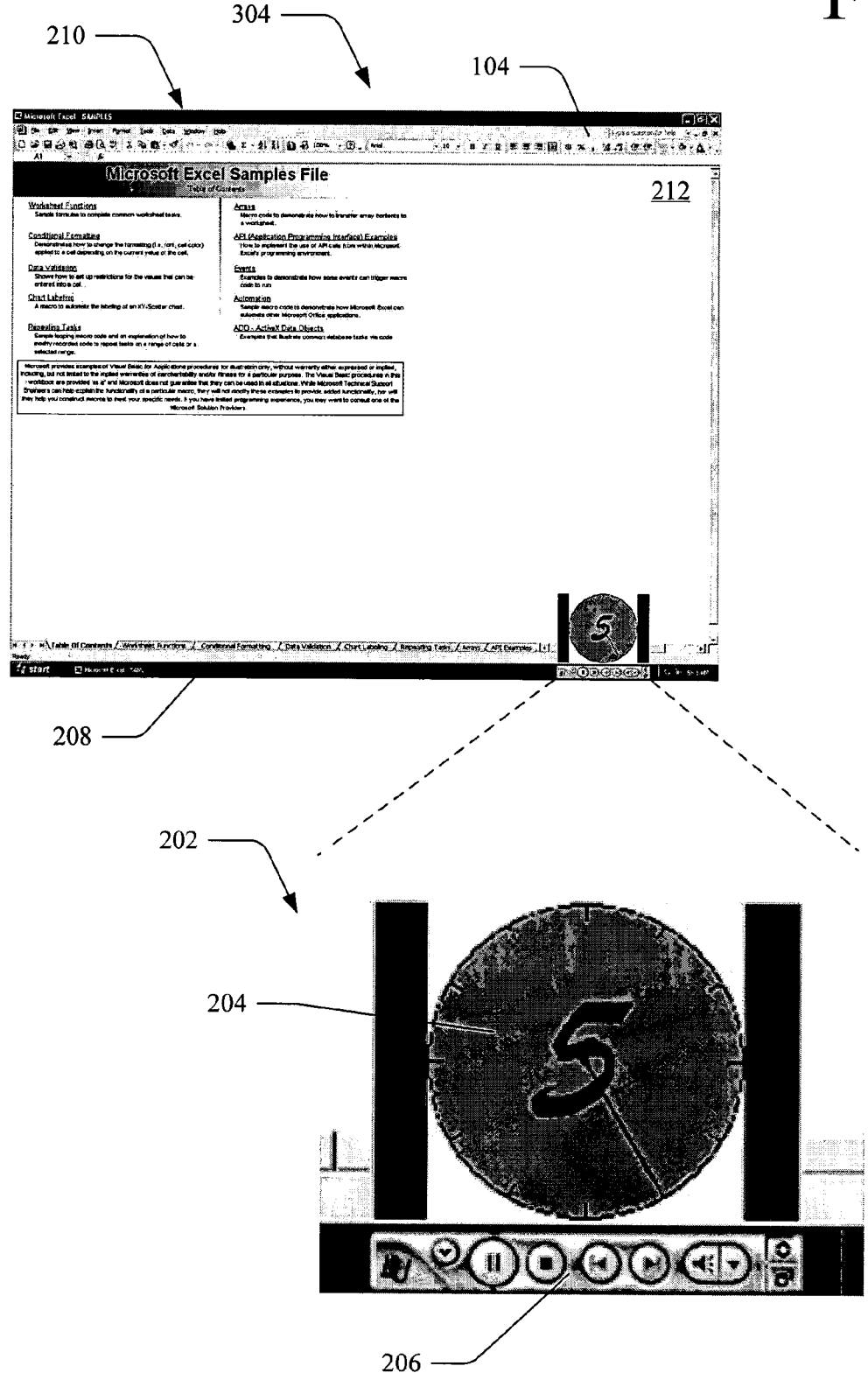
FIG. 2 illustrates an exemplary user interface for a non-media-playing application and a taskbar media player's user interface, the taskbar media player showing a graphic in its visual space.

In FIG. 2, however, an example of a taskbar media player's user interface 202 is shown. In this example the player user interface 202 includes a visual space 204 displaying a similar graphic as shown in FIG. 1. The player user interface 202 also includes controls 206, shown integrated into an exemplary taskbar user interface 208 shown at the bottom of an exemplary screen shot 210. In this example the player controls 206 remain visible and ready for use even if the non-media-playing application and its window 104 are in perspective.

Exemplary System

Overview

Figure 3:
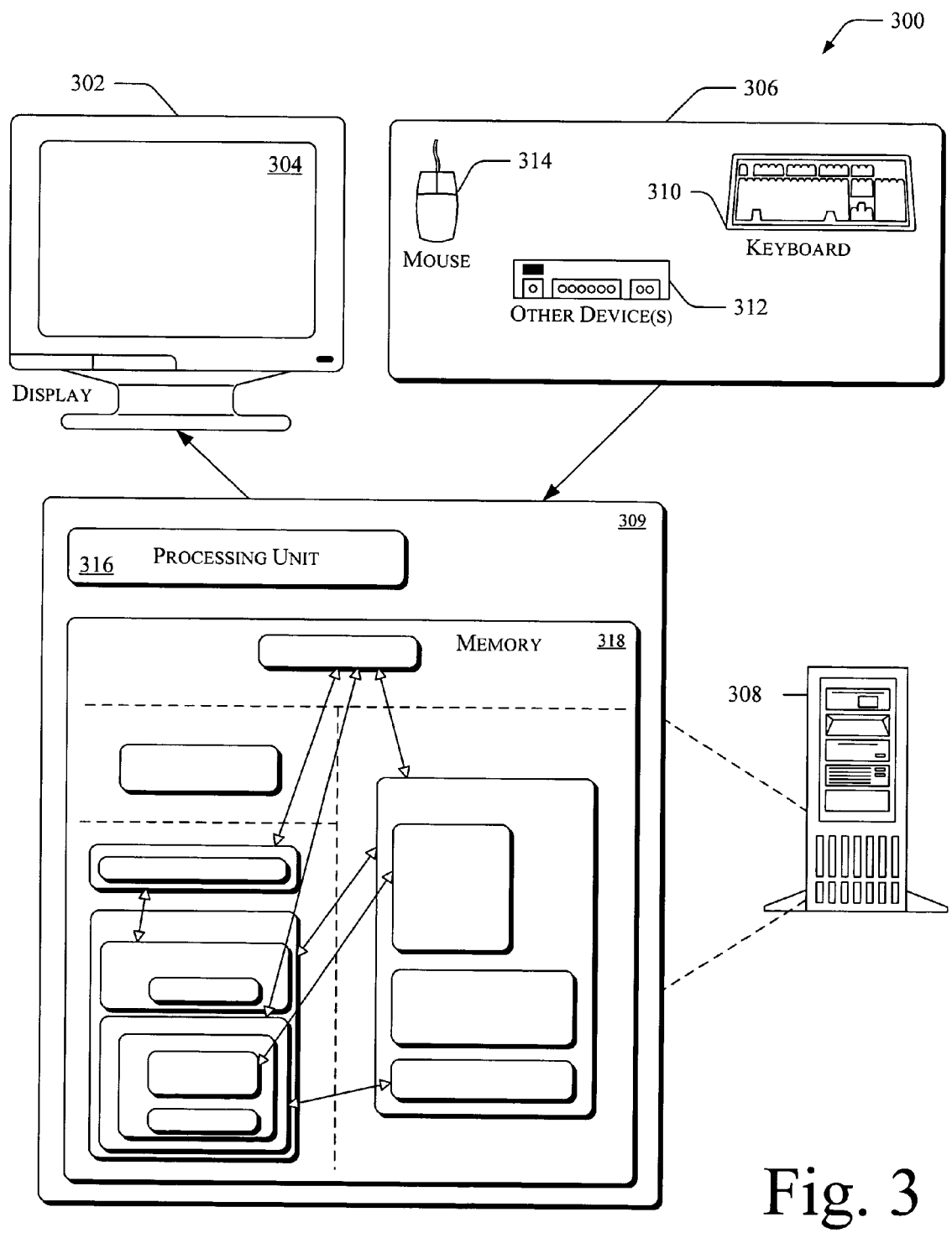
FIG. 3 illustrates a computer system for a taskbar media player.
Figure 5:
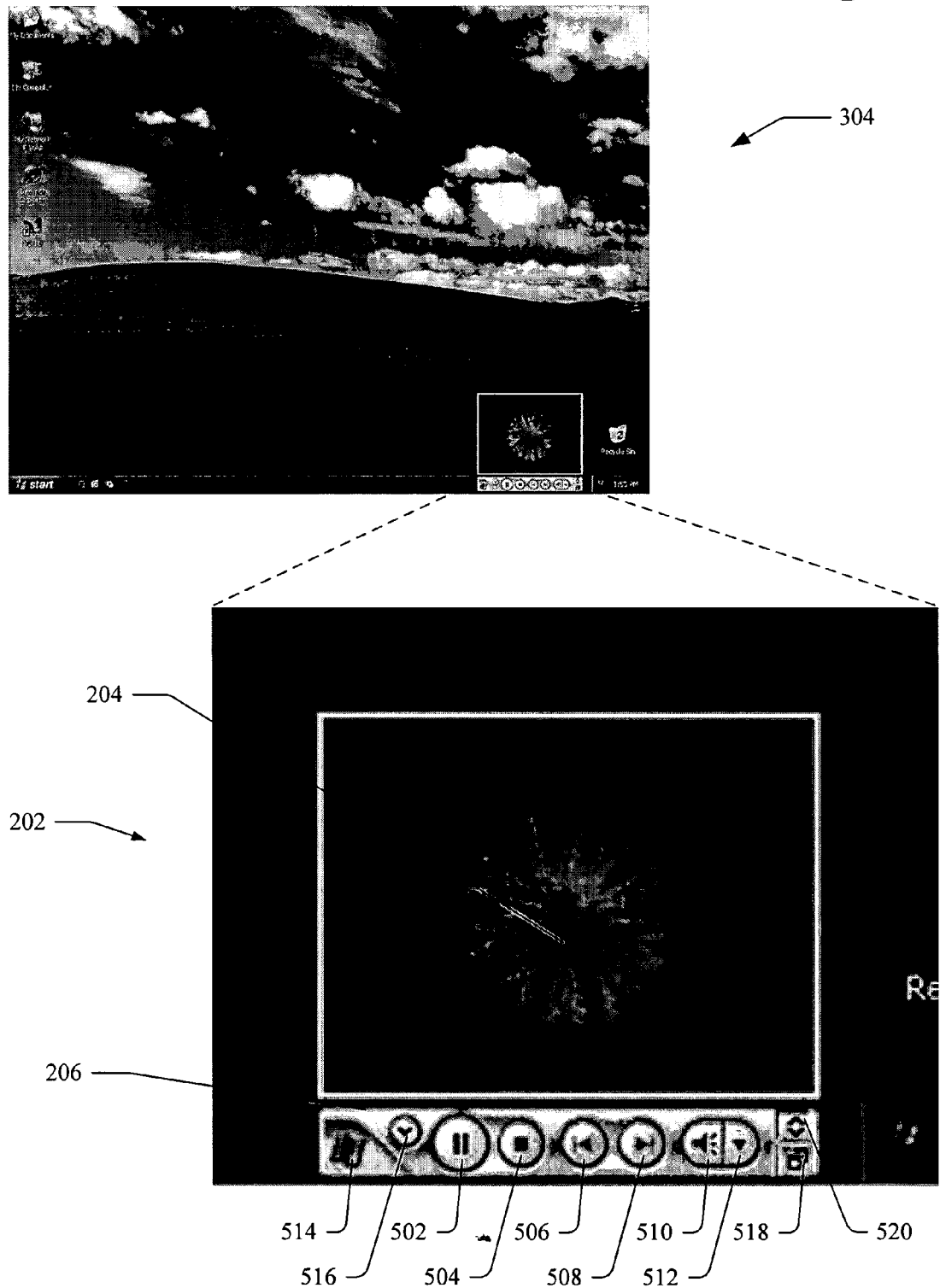
FIG. 5 illustrates an exemplary user interface of a taskbar media player showing a visualization in a visual space.

FIG. 3 shows an exemplary system 300 usable to create a taskbar media player and facilitate related methods. The system 300 includes a display 302 having a screen 304, a user-input device 306, and a computer 308. The user-input device 306 can include any device allowing a computer to receive input from a user, such as a keyboard 310, other devices 312, and a mouse 314. The other devices 312 can include a touch screen, a voice-activated input device, a track ball, and the like. The user can send input via the user-input device 306 to the computer 308 to control media, for instance. The user can use the display 302 and its screen 304 to view user interfaces, including those containing visual media. FIGS. 1, 2, and 5 show examples of the screen 304.

The computer 308 includes components shown in block 309, such as a processing unit 316 to execute applications and a memory 318 containing various applications and the processes that contain them. The memory 318 includes volatile and non-volatile memory and the applications described in FIG. 4.

Figure 4:
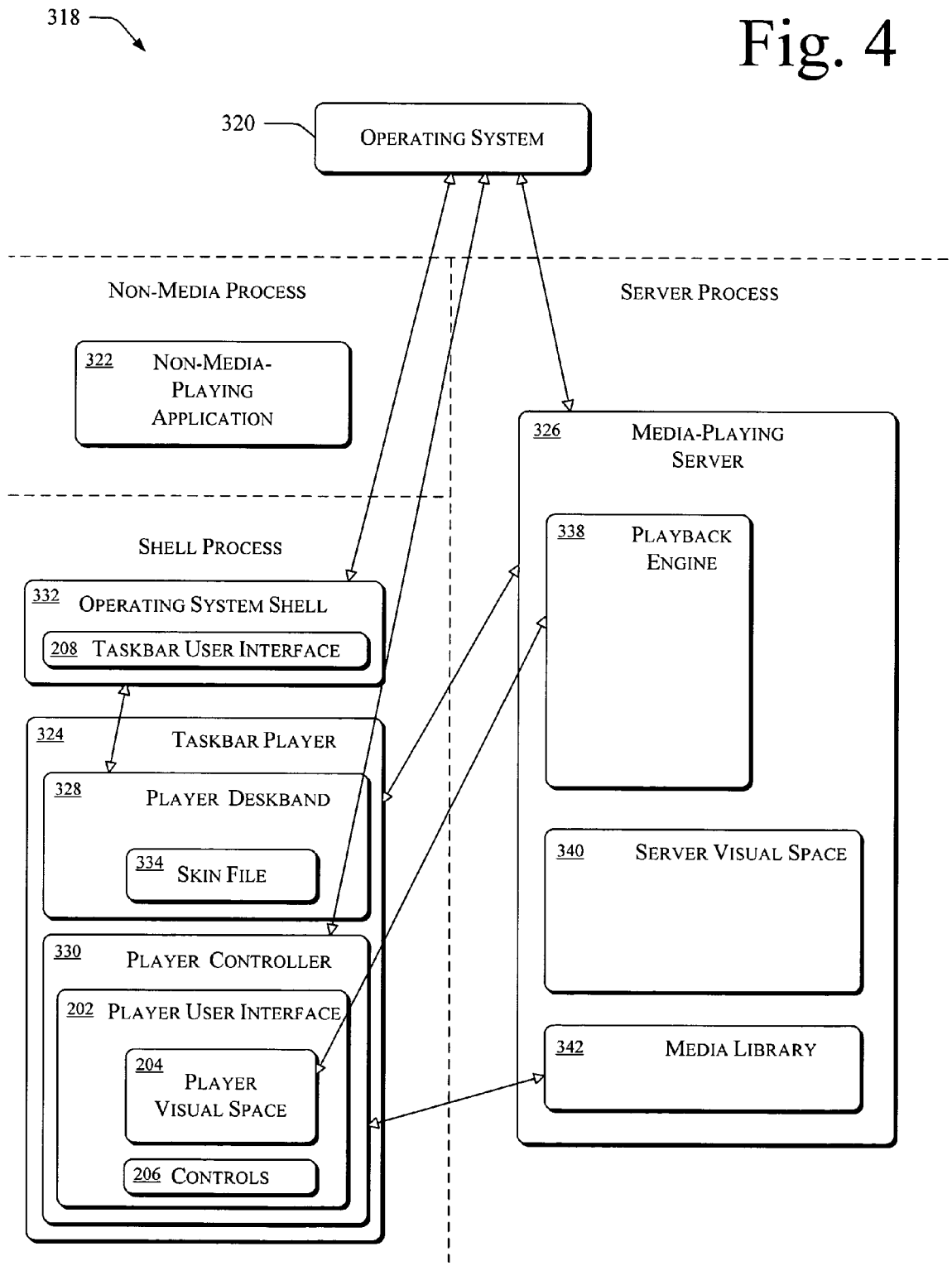
FIG. 4 illustrates an architecture showing a non-media-playing application's process, an operating system shell process, and a media-playing server's process and applications running within them, which are within the memory of the computer system of FIG. 3.

FIG. 4 shows applications included within the memory 318 of FIG. 3, communication between these programs (shown as solid lines), and process boundaries (shown as dashed lines). The memory 318 includes an operating system 320, a non-media-playing application 322, a taskbar player 324, and a media-playing server 326. The non-media-playing application 322 can be one of many different types. One exemplary type is a Microsoft® Excel® spread-sheet application shown in FIGS. 1 and 2.

The Taskbar Player

The taskbar player 324 includes a player deskband 328 and a player controller 330. The player deskband 328 communicates with an operating system shell 332, which in turn communicates with the operating system 320.

The operating system shell 332 is an application that implements a user interface that is tightly integrated with the operating system 320. This tight integration allows the operating system shell 332 and the operating system shell process in which it runs additional flexibility not available to other processes and the applications that run within them.

The player deskband 328 is a program module that communicates with the operating system shell 332. The player deskband 328 determines parameters for how the taskbar player 324 is to operate with the operating system shell 332. The player deskband 328 stores these parameters for later use by the taskbar player 324 in a skin file 334.

This skin file 334 helps the taskbar player 324 build the player user interface 202. Parameters held in the skin file 334, for instance, include a size and position in the operating system shell's 332 user interface 208 that the taskbar player 324's user interface 202 is allotted. The skin file 334 and the player user interface 202 will be discussed in greater detail below.

Through the communication between the player deskband 328, the operating system shell 332, and the operating system 320, the player deskband 328 enables the player user interface 202 (and the taskbar player 324) to be integrated with the operating system shell 332.

This integration with the operating system shell 332 allows, for instance, the taskbar player's 324 controls 206 to not take up available screen space beyond that used by the operating system shell 332. The controls 206 do not have to take Up available space because the controls 206 can be integrated into the existing user interface used by the operating system shell 332 (here the taskbar user interface 208). Because the controls 206 do not have to take up available screen space, the controls 206 do not have to alter an existing layout or behavior of other application's user interfaces. The controls 206, for instance, can be implemented such that they do not obscure or require movement or resizing of other user interfaces (such as a non-media-playing application user interface 212 of FIG. 2).

Also by being integrated, the taskbar player 324 operates with the operating system shell 332 and executes within the shell process, allowing the taskbar player 324 to interact with a user but still allow interaction between the user and an in-perspective application or process, such as the non-media-playing application 322.

The operating system shell 332 can interact with a user without being in perspective, even though it can appear to be in perspective. Thus, to a user the taskbar player 324 acts as if it is in perspective, allowing the user to interact with it's player user interface 202 without first selecting the player user interface 202 to put it into perspective. Also, the user does not have to leave the non-media-playing application 322, thereby putting it out of perspective, to interact with operating system shell 332 (and thus the integrated taskbar player 324).

The player deskband 328 also can build the skin file 334. The skin file 334 contains parameters useful in building the player user interface 202 into the taskbar user interface 208. These parameters can include text, art, and script parameters, which can govern the text used in, the graphics and look of, and various other parameters governing the player user interface 202. The other parameters can include the position, size, and operating specifications for the player user interface 202.

These other parameters can be attained by the player deskband 328 through communication with the operating system shell 332. In one implementation, a user can choose and alter text, art, and script parameters so that the player user interface 202 conforms to the user's preferences. These preferences can be retained by the taskbar player 324 or the operating system shell 332.

Also through this communication, the player deskband 328 can instruct the operating system shell 332 to dedicate a minimum size and a particular position for the player user interface 202 in the operating system shell's 332 user interface 208.

The player controller 330 implements the player user interface 202. The player controller 330, in one implementation, is an ActiveX control, which is integrated into the taskbar player 324. The player user interface 202 creates the taskbar player visual space 204 and the controls 206 from which a user can select various media services. The taskbar player visual space 204 is a space on the screen 304, such as in a window, in which visual media can be displayed.

FIG. 5 shows an example of the screen 304, the player user interface 202, the taskbar player visual space 204, and the controls 206.

The player user interface 202 can, through the controls 206 or otherwise, enable a user to control media. The controls 206 include various control buttons for easy selection of a media-playing service. A user can, for instance, use the mouse 314 to click on the control buttons on the player controls 206.

In one implementation, the user can select the following services by clicking on (or, in some cases, hovering their mouse icon over) the following control buttons: that the media file be paused with a pause control button 502; that the media file be stopped with a stop control button 504; that the taskbar player 324 go to a previous track in the media file (such as a compact disc playing album tracks) with a previous track control button 506; similarly, that the taskbar player 324 go to a next track with a next track control button 508; that a volume for the media file be muted/unmuted with a mute control button 510; that the volume for the media file be increased or decreased with a volume control button 512; that metadata for the media file be presented (or options for metadata) with a metadata control button 514; that the taskbar player visual space 204 be hidden or shown with visual space control button 520; that the taskbar player 324 switch play of the media file to a larger, more advanced media player like the media-playing server 326 with an advanced services control button 518; or that a menu for the media library 342 be presented with a library button 516.

The player user interface 202 can also enable the user to play a media file by allowing the user to drag-and-drop a system object (e.g., an icon) representing a media file onto the controls 206, the taskbar player visual space 204, or another part of the player user interface 202.

The taskbar player 324 is capable of playing back audio files, visual files, a combination of both (like a music video), television, photos, and the like. The taskbar player 324 is also capable of presenting metadata, like information about songs on a CD being played or other media accessible by the taskbar player 324.

Figure 6:
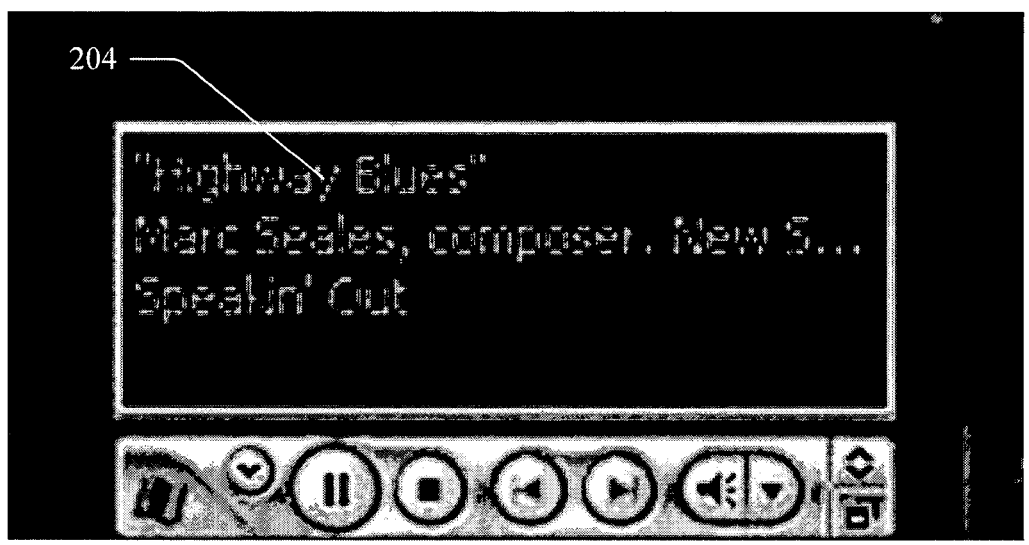
FIG. 6 illustrates an exemplary user interface of a taskbar media player showing metadata in a visual space.

FIG. 6 shows an example of metadata presented through the player user interface 202, shown in the taskbar player visual space 204. This metadata includes facts about a particular song, here that the song being played is entitled "Highway Blues", was composed by "Marc Seales", and is from an album named "Speakin' Out." The metadata can be accessed by the taskbar player 324 through the media-playing server 326, internal to the taskbar player 324, or otherwise. The metadata can be selected for viewing by the user with the metadata control button 514 shown in FIG. 5.

The player user interface 202 can also enable the user to search through media (and related metadata) in the media library 342. In one implementation, the player user interface 202 enables the user to pick through metadata.

Figure 7:
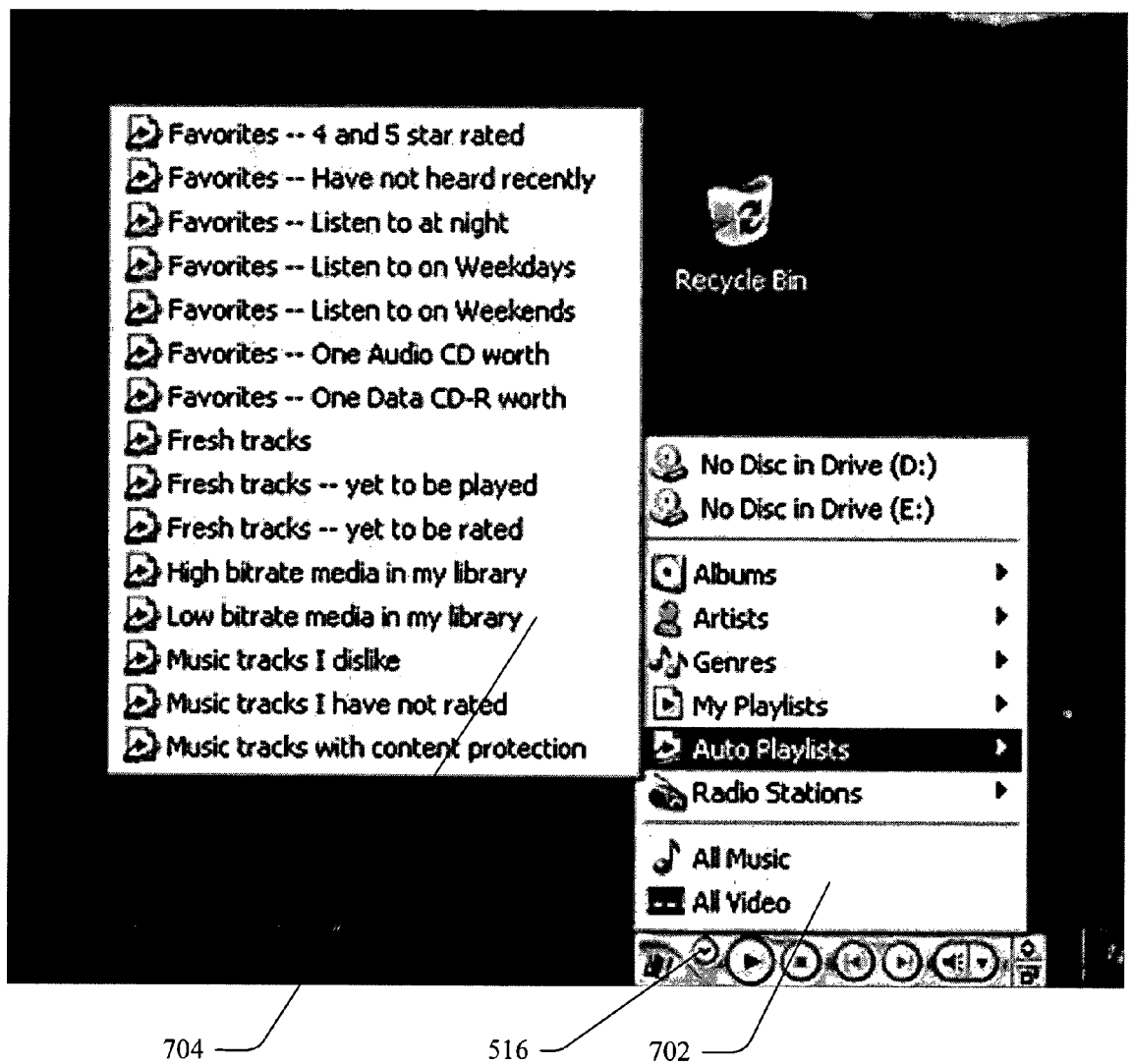
FIG. 7 illustrates an exemplary user interface of a taskbar media player showing dialog boxes in a visual space for selection of metadata.

FIG. 7 shows an example of one way in which the player user interface 202 enables a user to pick through metadata within a media library 342. FIG. 7 shows the library button 516 and a media selection dialog box 702 allowing the user to select various media categories. FIG. 7 also shows a list of media files selected by the user through the media selection dialog box 702 ("Auto Playlists"), shown in a media files dialog box 704. This list includes information about playlists of media files. It includes information about files the user has rated highly, plays often, has not played recently, listens to on weekdays, listens to on weekends, has not played, has not rated yet, and dislikes. It also includes information about files that are new to the user or are protected, as well as information about high and low bitrate media files available.

As shown in this example and further above, the taskbar player 324 enables a user to enjoy many services with an easy-to-use graphical interface.

The Media-Playing Server

The media-playing server 326 includes a playback engine 338, a server visual space 340, and the media library 342. An example of the server visual space 340 is shown in FIG. 1. The server visual space 340 comprises a portion of the computer's 308 graphical display area that the media-playing server 326 governs and through which it presents graphical information to the user. The space is typically a window or a portion of a window.

The playback engine 338 renders media files in the player visual space 204 and plays audio. It can also render and play media for the media-playing server 326. The playback engine 338 is shown in FIG. 4 as part of the media-playing server 326, but can be internal to the taskbar player 324 or run inside an operating system shell process in which the taskbar player 324 runs.

The playback engine 338, in this implementation, runs as part of the media-playing server 326 to enable a user to switch play of a media file to another process (like the server process of FIG. 4). Thus, if the user wants to expand the media being played to a larger space with advanced services, the user can do so. The taskbar player 324 enables the user, such as with the advanced services control button 518 on the controls 206 as shown in FIG. 5, to switch rendering of the media file to the media-playing server 326 to enjoy more advanced services. An example of the media-playing server 326 presenting a media file in the server visual space 340 is shown in FIG. 1.

The taskbar player 324 can use the playback engine 338 for other services, like rendering metadata or visualizations in the taskbar player visual space 204. In the implementation shown in FIG. 4, however, the taskbar player 324 renders metadata and visualizations internally.

The taskbar player's 324 player controller 330 can use the media library 342 in the server process shown in FIG. 4. The taskbar player 324 can also use its own library (not shown).

The above devices and applications are merely representative, and other known devices and programs may be substituted for or added to those shown in FIGS. 3 and 4. One example of another known device that can be substituted for those shown in FIGS. 3 and 4 is the device shown in FIG. 10.

Control of Media

Overview

Figure 8:
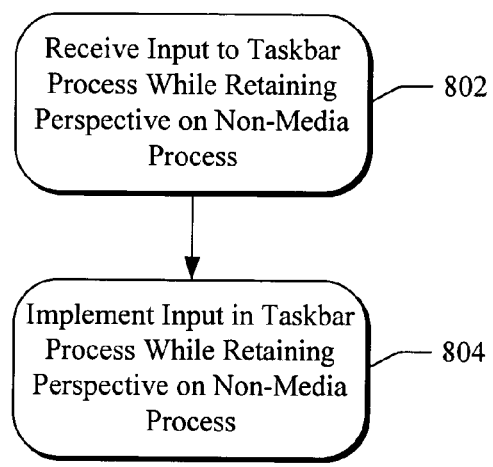
FIG. 8 is a flow diagram of an exemplary method for controlling media through a user interface without switching perspective to that user interface.

FIG. 8 shows a flow diagram 800 for enabling a user to control media while working in a non-media-playing application. This and the following flow diagram are illustrated as series of blocks representing operations or acts performed by the system 300. These diagrams may be implemented in any suitable hardware, software, firmware, or combination thereof. In the case of software and firmware, they represent sets of operations implemented as computer-executable instructions stored in memory and executable by one or more processors.

In the flow diagram 800, the system 300 enables a user to interact with the player user interface 202, thereby allowing control of media, without losing perspective on the non-media-playing application 322. The user is able to continue working in the non-media-playing application 322 while also being able to control media.

The system 300 also enables a user to interact with the player user interface 202 without needing to bring the player user interface 202 into perspective.

In one implementation, the system enables a user to interact with the player user interface 202 without needing to bring the player user interface 202 into focus.

At block 802, the system 300 receives input through the player user interface 202 to control media without the player user interface 202 being in perspective and/or other applications losing perspective. By so doing, the system 300 saves the user time and energy. The user can select, with as little as one command (such as a mouse click), to stop, start, pause, move to next track, and alter the media's visual space or volume. Further, the user can do so while working in the non-media-playing application 322 without interrupting his or her work with the non-media-playing application's 322 window or user interface.

FIG. 2 shows an example of the screen 304 displaying an example of the non-media-playing application user interface 212 generated by the non-media-playing application 322, and the player user interface 202. Here the non-media-playing application user interface 212 remains in perspective, thereby allowing a user to interact and otherwise work in the non-media-playing application 322. By being in perspective, the non-media-playing application 322 can continue to interact with the user. This interaction can include display of ongoing functions, like new email being received, computations being run, and results of the computations being shown. This interaction can also include enabling the user to input commands and otherwise interact with the non-media-playing application 322.

While keeping the non-media-playing application 322 in perspective, the system 300 allows the user to interact with the player user interface 202 to control media. In this example a media file being played includes a graphic, shown in the taskbar player visual space 204 of FIG. 2. The user can control the media played through selecting services with control buttons on the controls 206 (such as the buttons shown in FIG. 5), drop-down lists, keystroke-entered commands, and in other manners.

In one implementation, the system 300 enables a user to control media as if the media user interface were part of or integrated with the non-media-playing application 322. In this implementation, the system 300 enables the user to control media running in another process (here the operating system shell process) while interacting with the non-media-playing process without interrupting the user's interaction with the non-media-playing process. Thus, the system 300 allows reception of input into the operating system shell process while retaining perspective on the non-media-playing application 322 running in the non-media-playing process (shown in FIG. 4).

At block 804, the system 300 controls the media in accordance with input received from the user. The system 300 is able to implement the control received by the taskbar player 324 while retaining perspective on the non-media-playing application 322 executing in another process.

A user can, for example, work in the non-media-playing application's 322 user interface 212 (which is in perspective), such as by typing information or selecting files, thereby interacting with the non-media-playing application 322. Then, while retaining perspective and full interactive capabilities with the non-media-playing application's 322 user interface 212, click on the controls 206 to select media-playing services. Following this selection, the taskbar player 324 can implement the selected service, such as forwarding to another track on an audio CD. The user is able to continue interacting with the non-media-playing application's 322 user interface 212 without having to bring back into perspective a window of the user interface 212 or perform other actions that may interrupt the user. This allows the user to efficiently work with the non-media-playing application 322 while also interacting with and controlling media running in the taskbar player 324.

Implementing the Taskbar Player

Figure 9:
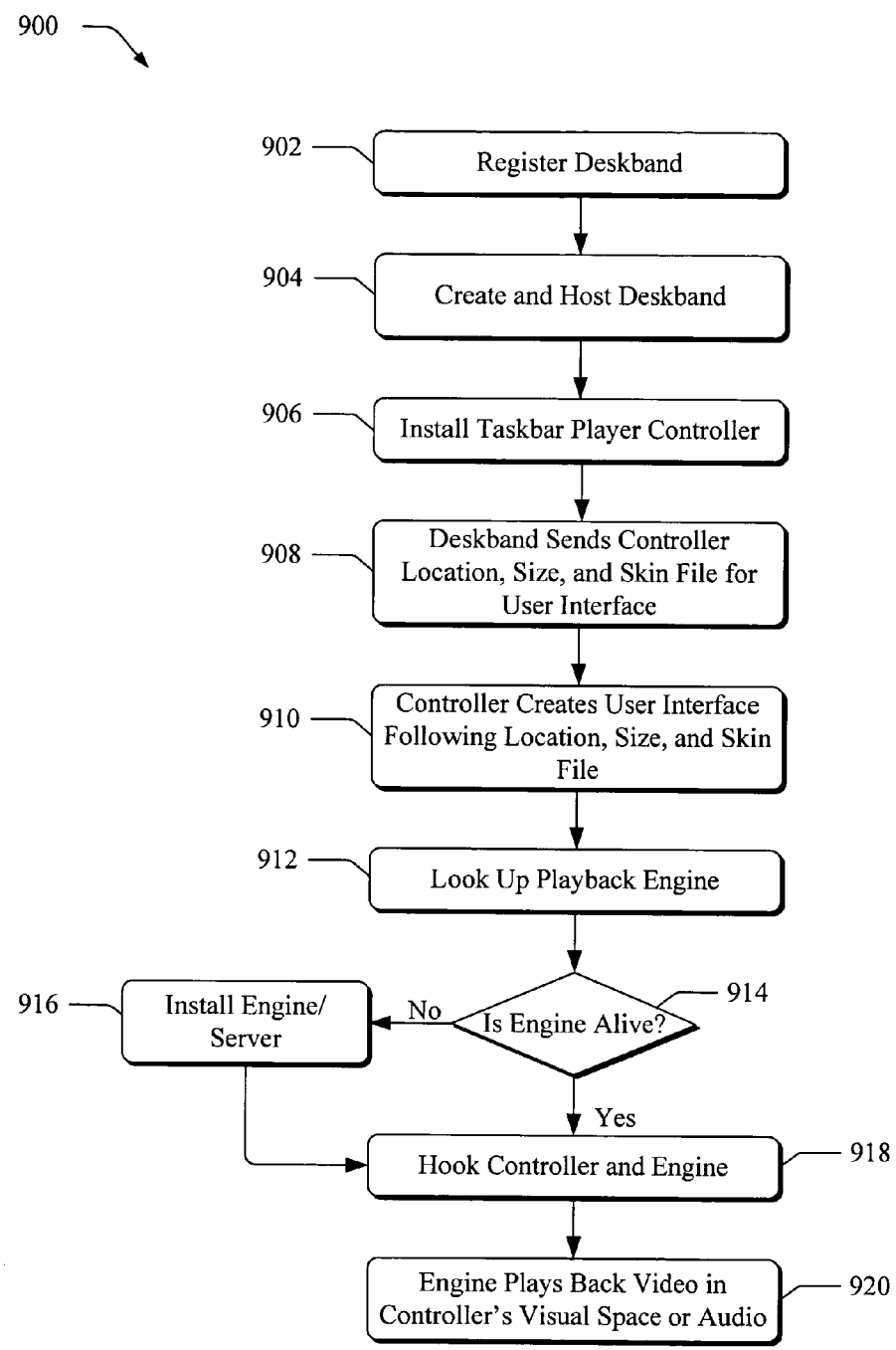
FIG. 9 is a flow diagram of an exemplary method for creating and using a taskbar media player.

FIG. 9 shows an exemplary implementation in flow diagram 900 for creating and using the taskbar player 324.

In block 902, the system 300 registers the taskbar player deskband 328. Then the operating system shell 332 creates and hosts the taskbar player deskband 328 (block 904). This deskband 328 can communicate with the operating system shell 332. The deskband 328 communicates with the operating system shell 332 to gain parameters for how the system 300 is to structure the player user interface 202 of the player controller 330. These parameters can be included in the skin file 334.

In block 906, the system 300 installs the player controller 330. This player controller 330 is responsible for building the player user interface 202, the taskbar player visual space 204, and the controls 206.

In block 908, the deskband 328 communicates with the controller 330 to relay the parameters for the player user interface 202. These parameters can be retained within the skin file 334. The skin file 334 includes the location, size, and various appearance parameters for the player user interface 202 to conform.

In block 910, the player controller 330 creates the user interface 202 conforming to the parameters in the skin file 334.

FIG. 2 shows an example of the player user interface 202. Here the player user interface 202 is built with a certain size (measured in pixels), a certain location (to the far right in the taskbar user interface 208), with a certain appearance (the controls 206 being colored grey and the manner to select services being buttons), and with the taskbar player visual space 204 having a particular size and location directly above the controls 206.

In block 912, the system 300 looks up the playback engine 338. The system 300 can use the player controller 330 to communicate with the operating system 320 to find the playback engine 338. The operating system 320 can then search through the server process to find the media-playing server 326 and/or the playback engine 338.

At block 914, if the playback engine 338 is not alive, the system 300 proceeds along the "No" path to block 916. If it is, it proceeds along the "Yes" path to block 918.

At block 916, the system 300 creates the playback engine 338 and, in some cases also the media-playing server 326.

At block 918 the system 300 hooks the player controller 330 to the playback engine 338. Here, the taskbar player 324 is communicating with the media-playing server 326, and the playback engine 338 is hooked to the player controller 330. The playback engine 338 can be hooked to the player controller 330 using a messaging system or architecture of the operation system 320. In one implementation, where the operating system 320 is a Windows® operating system, Windows® messaging is used. These are hooked so that the playback engine can render a visual media file or play an audio media file (or both) for the player controller 330.

Thus, in cases where the playback engine 338 is asked to render video for the player controller 330, the playback engine 338 renders video directly to the taskbar player visual space 204, which the taskbar player visual space 204 then presents (block 920).

In cases where the playback engine 338 is playing back audio, it communicates the audio to speakers and the like, rather than the player controller 330 (block 920), though non-audio (such as accompanying video or information about or accompanying the audio) is still communicated to the player controller 330.

The playback engine 338 runs in another process and can run within the media-playing server 326 to allow a user to easily and quickly switch presentation of video or playback of audio to the media-playing server 326. This media-playing server 326 can offer many advanced services, which the user may wish to enjoy. Having the playback engine 338 run in this other process is not necessary for use of the taskbar player 324, but can aid the user in switching back and forth between the media-playing server 326 and the taskbar player 324.

A Computer System

Figure 10:
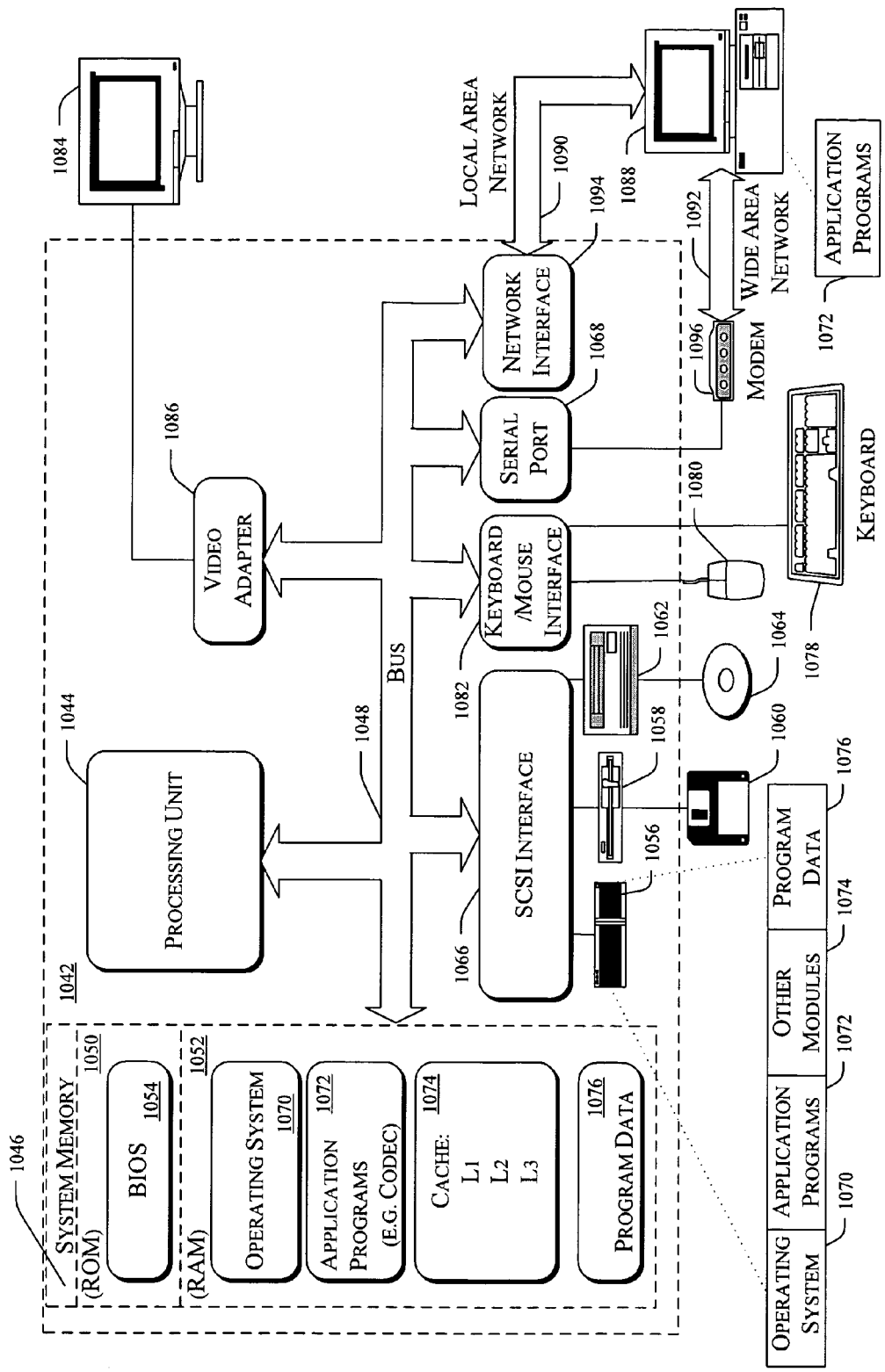
FIG. 10 is a block diagram of a computer system that is capable of implementing a method for controlling media through a taskbar player.

FIG. 10 shows an exemplary computer system that can be used to implement the processes described herein. Computer 1042 includes one or more processors or processing units 1044, a system memory 1046, and a bus 1048 that couples various system components including the system memory 1046 to processors 1044. The bus 1048 represents one or more of any of several types of bus structures, including a memory bus or memory controller, a peripheral bus, an accelerated graphics port, and a processor or local bus using any of a variety of bus systems. The system memory 1046 includes read only memory (ROM) 1050 and random access memory (RAM) 1052. A basic input/output system (BIOS) 1054, containing the basic routines that help to transfer information between elements within computer 1042, such as during start-up, is stored in ROM 1050.

Computer 1042 further includes a hard disk drive 1056 for reading from and writing to a hard disk (not shown), a magnetic disk drive 1058 for reading from and writing to a removable magnetic disk 1060, and an optical disk drive 1062 for reading from or writing to a removable optical disk 1064 such as a CD ROM or other optical media. The hard disk drive 1056, magnetic disk drive 1058, and optical disk drive 1062 are connected to the bus 1048 by an SCSI interface 1066 or some other appropriate interface. The drives and their associated computer-readable media provide nonvolatile storage of computer-readable instructions, data structures, program modules and other data for computer 1042. Although the exemplary environment described herein employs a hard disk, a removable magnetic disk 1060 and a removable optical disk 1064, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 1056, magnetic disk 1060, optical disk 1064, ROM 1050, or RAM 1052, including an operating system 1070, one or more application programs 1072 (such as the taskbar player 324), other program modules 1074, and program data 1076. A user may enter commands and information into computer 1042 through input devices such as a keyboard 1078 and a pointing device 1080. Other input devices (not shown) may include a microphone, joystick, game pad, satellite dish, scanner, or the like. These and other input devices are connected to the processing unit 1044 through an interface 1082 that is coupled to the bus 1048. A monitor 1084 or other type of display device is also connected to the bus 1048 via an interface, such as a video adapter 1086. In addition to the monitor, personal computers typically include other peripheral output devices (not shown) such as speakers and printers.

Computer 1042 commonly operates in a networked environment using logical connections to one or more remote computers, such as a remote computer 1088. The remote computer 1088 may be another personal computer, a server, a router, a network PC, a peer device or other common network node, and typically includes many or all of the elements described above relative to computer 1042. The logical connections depicted in FIG. 10 include a local area network (LAN) 1090 and a wide area network (WAN) 1092. Such networking environments are commonplace in offices, enterprise-wide computer networks, intranets, and the Internet.

When used in a LAN networking environment, computer 1042 is connected to the local network through a network interface or adapter 1094. When used in a WAN networking environment, computer 1042 typically includes a modem 1096 or other means for establishing communications over the wide area network 1092, such as the Internet. The modem 1096, which may be internal or external, is connected to the bus 1048 via a serial port interface 1068. In a networked environment, program modules depicted relative to the personal computer 1042, or portions thereof, may be stored in the remote memory storage device. It will be appreciated that the network connections shown are exemplary and other means of establishing a communications link between the computers may be used.

Generally, the data processors of computer 1042 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the blocks described below in conjunction with a microprocessor or other data processor. The invention also includes the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

The above-described system includes a taskbar player, which enables a user to control and play media from a taskbar. The taskbar player and related methods also enable the user to control media while remaining in perspective with another application. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A computer-readable storage medium comprising computer-executable instructions that, when executed by a computer, implement a taskbar player, the taskbar player comprising:
    a player deskband; and
    a player controller, the player controller configured to implement a player user interface that enables a user to select media-playing services, the player user interface integrated into an existing taskbar user interface of an operating system shell and including multiple controls for selection of the media-playing services, the multiple controls displayed simultaneously in the taskbar user interface of the operating system shell and including at least a play control, a pause control, or a stop control.

2. The computer-readable storage medium of claim 1, wherein the player user interface further enables the user to select media-playing services with a single click of a mouse.

3. The computer-readable storage medium of claim 1, wherein the player user interface further enables the user to select media-playing services with a single click of a mouse when another application running in another process is in perspective.

4. The computer-readable storage medium of claim 3, wherein the perspective includes the other application being in focus.

5. The computer-readable storage medium of claim 1, wherein the player user interface further enables the user to select media-playing services without altering a perspective of another application running in another process.

6. The computer-readable storage medium of claim 1, wherein the multiple controls include buttons for selection of the media-playing services.

7. The computer-readable storage medium of claim 1, wherein the multiple controls enable selection of the media-playing services including services that stop and pause a first media file being played and start a second media file.

8. The computer-readable storage medium of claim 1, wherein the multiple controls include a control button for selection of the media-playing services including a service that alters a size for a presenting of a visual aspect of a media file.

9. The computer-readable storage medium of claim 1, wherein the multiple controls include a control button for selection of the media-playing services including a service that alters a volume for a playback of an audio aspect of a media file.

10. The computer-readable storage medium of claim 1, further comprising:
    a visual space for presenting visual media.

11. The computer-readable storage medium of claim 1, further comprising:
    a visual space for presenting visual media;
    wherein the player user interface enables the user to select media-playing services to alter the presenting in the visual space.

12. The computer-readable storage medium of claim 1, further comprising:
    a visual space for presenting metadata associated with a media file.

13. The computer-readable storage medium of claim 1, further comprising:
    a visual space for presenting metadata associated with a media file,
    wherein the player user interface enables the user to select media-playing services to present metadata associated with the media file.

14. A system comprising:
    a media-playing application in computer memory executing in a shell process of an operating system, the media-playing application including a player deskband and a player controller, the player controller configured to enable a user to control media through a player user interface having multiple controls integrated into an existing taskbar user interface associated with the shell process, the multiple controls comprising at least one of a play control, a pause control, a stop control, a previous track control, a next track control, a volume control, a mute control, a metadata control, a visual space control, a switch play control, or a library control, the multiple controls displayed in the taskbar.

15. The system of claim 14, wherein preferences for displaying the player user interface in the existing taskbar user interface are retained by the media-playing application for future use.

16. The system of claim 14, wherein the media-playing application is capable of receiving preferences for how the player user interface is displayed and used that are received from the user through another application executing in the shell process.

17. The system of claim 14, wherein the player deskband is capable of receiving preferences relating to the player user interface and sending the preferences to the media-playing application.

18. The system of claim 14, wherein the deskband is configured to communicate with the shell process and the operating system.

19. The system of claim 14, wherein the media-playing application is capable of creating the player user interface to have a minimum visual size on the existing taskbar user interface.

20. The system of claim 14, wherein the media-playing application is capable of creating the player user interface following a skin file containing text, art, and script parameters.

21. The system of claim 14, wherein the media-playing application is capable of presenting visual media.

22. The system of claim 14, wherein the media-playing application is capable of presenting audio media.

23. The system of claim 14, wherein the media-playing application is capable of presenting metadata associated with a media file being presented by the media-playing application.

24. A system comprising:
    a deskband;
    a player controller;
    a playback module;

a visual space; and a player user interface, wherein:

the player controller is capable of creating the player user interface;

the player user interface is integrated within an existing taskbar user interface associated with an operating system shell and is capable of enabling a user to input preferences for play of a media file, the player user interface including multiple controls that are displayed simultaneously in the existing taskbar user interface associated with the operating system shell including at least a play control, a pause control, or a stop control; and the playback module is capable of rendering the media file to enable the player controller to present the media file in the visual space and with the visual space remaining visible over all other windows on a screen in which the player user interface and the existing taskbar user interface associated with the operating system shell is presented.

25. The system of claim 24, wherein the deskband is capable of aiding the player controller in determining parameters for the player user interface to conform by communicating with an operating system that governs the existing taskbar user interface associated with the operating system shell.

26. The system of claim 24, wherein the deskband is capable of building a file containing parameters for the player user interface to conform to an operating-system shell governing the existing taskbar user interface associated with the operating system shell.

27. The system of claim 24, wherein the visual space is graphically connected to the player user interface.

28. The system of claim 24, wherein the player user interface includes media-playing services that stop, play, pause, skip forward or backward through, and change to a next or previous track of the media file.

29. The system of claim 24, wherein the player user interface is capable of enabling the user to input preferences through dragging and dropping an icon representing a media file onto the visual space or the player user interface.

30. The system of claim 24, wherein the player user interface and the playback module execute in different processes.

31. The system of claim 24, wherein the player user interface and the playback module execute in one process.

32. The system of claim 24, wherein the player user interface executes in a first process governing the existing taskbar user interface associated with the operating system shell, the playback module executes in a second process, and the player user interface includes a button to select a service that switches presentation of media from the visual space to a second visual space created by an application running in the second process.

33. A method comprising:

presenting, by a player controller of a taskbar player, a player user interface having multiple controls and integrated into an existing taskbar user interface of an operating system shell, the multiple controls displayed simultaneously in the existing taskbar user interface and including at least a play control, a pause control, or a stop control, the taskbar player further including a deskband; and enabling, without the player user interface being in perspective, a user to select media-playing services through the multiple controls of the player user interface.

34. The method of claim 33, wherein the enabling is performed also without the player user interface being in focus.

35. The method of claim 33, further comprising:

presenting a media file in accord with the selected media-playing services.

36. The method of claim 33, further comprising:

presenting a visual media file in a visual space integrated with the player user interface in accord with the selected media-playing services.

37. The method of claim 33, further comprising:

presenting a visual media file in a visual space without the visual space being in perspective.

38. The method of claim 33, further comprising:

presenting a visual media file in a visual space without the visual space being in focus.

39. A computer-readable medium comprising computer-executable instructions that perform the following when executed by a computer:

present, via a player controller of a taskbar player, a player user interface having multiple controls in a first process for controlling services associated with playing media, the multiple controls displayed simultaneously in an existing taskbar of an operating system shell and including at least a play control, a pause control, or a stop control, the taskbar player further including a deskband; and enable a user that is actively engaged with a non-player user interface in a second process to interact with the player user interface through selection of one or more of the multiple controls by clicking one time on one of the multiple controls without disengaging from the non-player user interface.

40. The computer-readable medium of claim 39, wherein the interaction with the player user interface further includes a single keystroke.

41. The computer-readable medium of claim 39, further comprising:

provide media-playing services based on the interaction.

42. The computer-readable medium of claim 39, further comprising:

present visual media in a visual space if the interaction includes a selection to present visual media.

43. The computer-readable medium of claim 39, further comprising:

present visual media with aid from a playback module executing in the first process if the interaction includes a selection to present visual media.

44. The computer-readable medium of claim 39, further comprising:

present visual media with aid from a playback module executing in a third process if the interaction includes a selection to present visual media.

45. A computer-readable medium comprising computer-executable instructions that perform the following when executed by a computer:

create, via a player controller of a taskbar player, a player user interface with graphically selectable media-control services and running in a first process, the player user interface integrated into an existing taskbar of an operating system shell and including multiple controls including at least a play control, a pause control, or a stopcontrol, the play control, pause control, or stop control displayed simultaneously in the taskbar, the taskbar player further including a deskband; and enable selection of the media-control services while an additional user interface running in a second process remains in perspective.

46. The computer-readable medium of claim 45, wherein the media-control services include initiating and ceasing play of a media file.

\* \* \* \* \*